United States Patent [19]

Price

[11] 4,168,123
[45] Sep. 18, 1979

[54] AIRCRAFT WEAPON SYSTEMS

[75] Inventor: Donald C. Price, Maidstone, England

[73] Assignee: Elliott Brothers (London) Limited, Chelmsford, England

[21] Appl. No.: 865,387

[22] Filed: Dec. 29, 1977

[30] Foreign Application Priority Data

Jan. 5, 1977 [GB] United Kingdom ............. 266/77

[51] Int. Cl.² ..................... G01B 11/26; F41F 5/00
[52] U.S. Cl. ................................. 356/152; 356/150; 89/1.5 C
[58] Field of Search ............... 89/1.5 C, 1.5 S, 1.815, 89/41 EA, 1.5 R, 1.5 E; 356/141, 150, 152, 172, 138; 244/75 A, 129.1 R

[56] References Cited

U.S. PATENT DOCUMENTS

| | | | |
|---|---|---|---|
| 2,464,485 | 3/1949 | Burroughs | 356/138 |
| 3,228,337 | 1/1966 | Grantham et al. | 102/221 |
| 3,633,212 | 1/1972 | Cooper | 356/118 |
| 3,709,608 | 1/1973 | Degan et al. | 356/152 |

Primary Examiner—S. C. Buczinski
Attorney, Agent, or Firm—Kirschstein, Kirschstein, Ottinger & Cobrin

[57] ABSTRACT

An aircraft weapon system including a component mounted on a wing of an aircraft and a radiation source and sensor arrangement for measuring changes in the alignment of the component with respect to a reference axis fixed with respect to the main body of the aircraft.

9 Claims, 3 Drawing Figures

AIRCRAFT WEAPON SYSTEMS

This invention relates to aircraft weapon systems.

In such systems it is common practice for a component of the system to be mounted on a wing of the aircraft. In some circumstances, for example, when the component is an imaging device such as a forward looking infra red sensor or a television camera, it is desirable to know the alignment of the component with respect to a reference axis fixed with respect to the main body of the aircraft, e.g. the aircraft boresight. The problem then arises that this alignment may vary due to deflection of the aircraft wing in flight.

It is an object of the present invention to provide an aircraft weapon system incorporating means whereby this problem is overcome.

According to the present invention there is provided an aircraft weapon system including a component adapted to be mounted on a wing of an aircraft and means for measuring changes in the alignment of the component with respect to a reference axis fixed with respect to the main body of the aircraft due to deflection of the wing, said means comprising: a source of electromagnetic radiation and an array of sensors for said radiation adapted to be mounted one on said component or on said wing adjacent where the component is mounted in use and the other on the main body of the aircraft, said source being arranged to direct a beam of radiation onto said array; and and means for producing an output signal representative of the position at which said beam impinges on said array.

In one particular system in accordance with the invention there are two said arrays and two said sources each arranged to direct a respective beam onto a respective said array, each said array being associated with a said means for producing an output signal and being so positioned with respect to its associated source that the two arrays give rise to output signals which together are representative of the pitch angle of said component with respect to the said reference axis.

One system in accordance with the invention will now be described by way of example with reference to the accompanying drawings in which.

Figure 1:
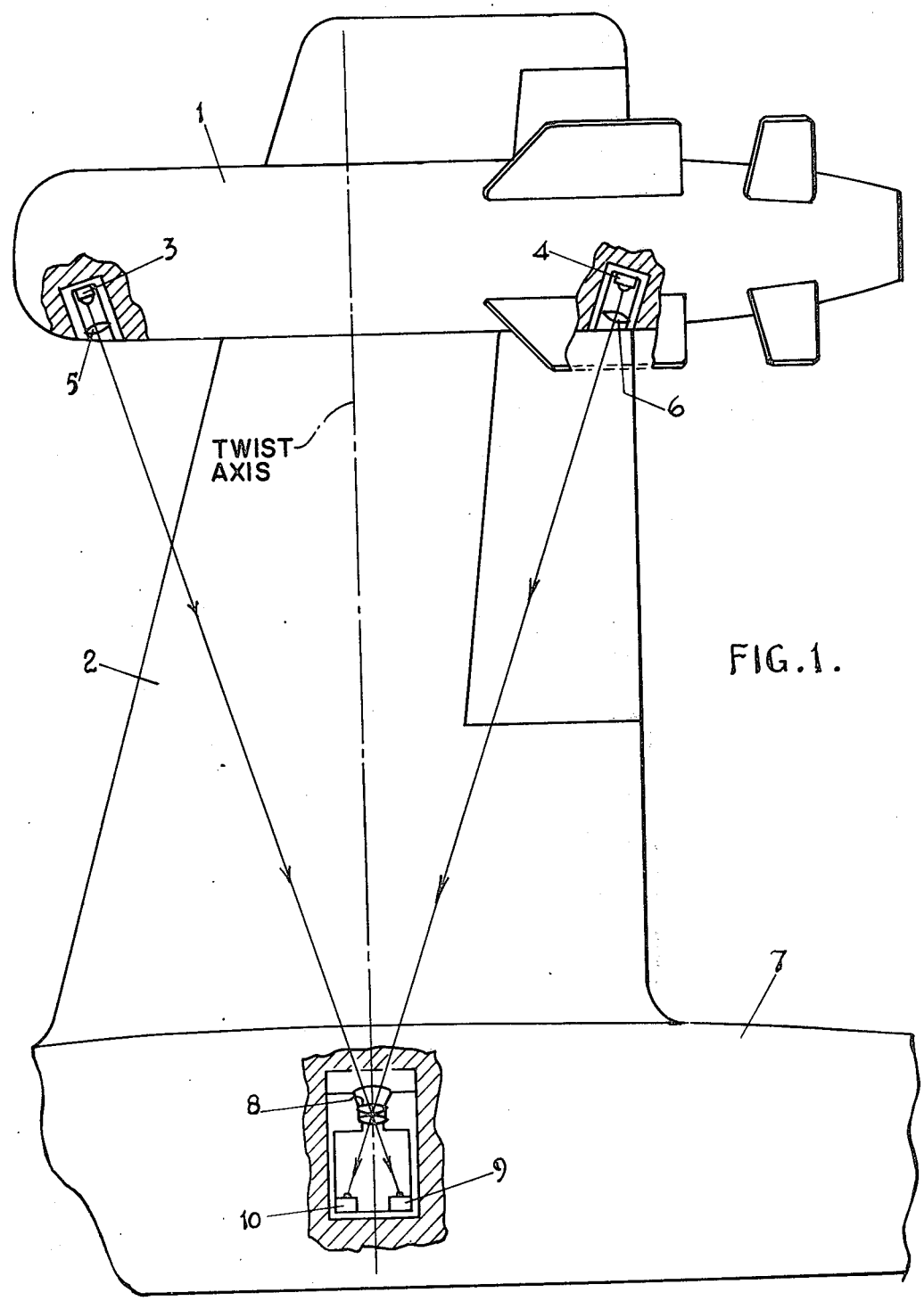
FIG. 1 is a diagrammatic view of part of an aircraft incorporating the system, from the underside of the aircraft.
Figure 2:
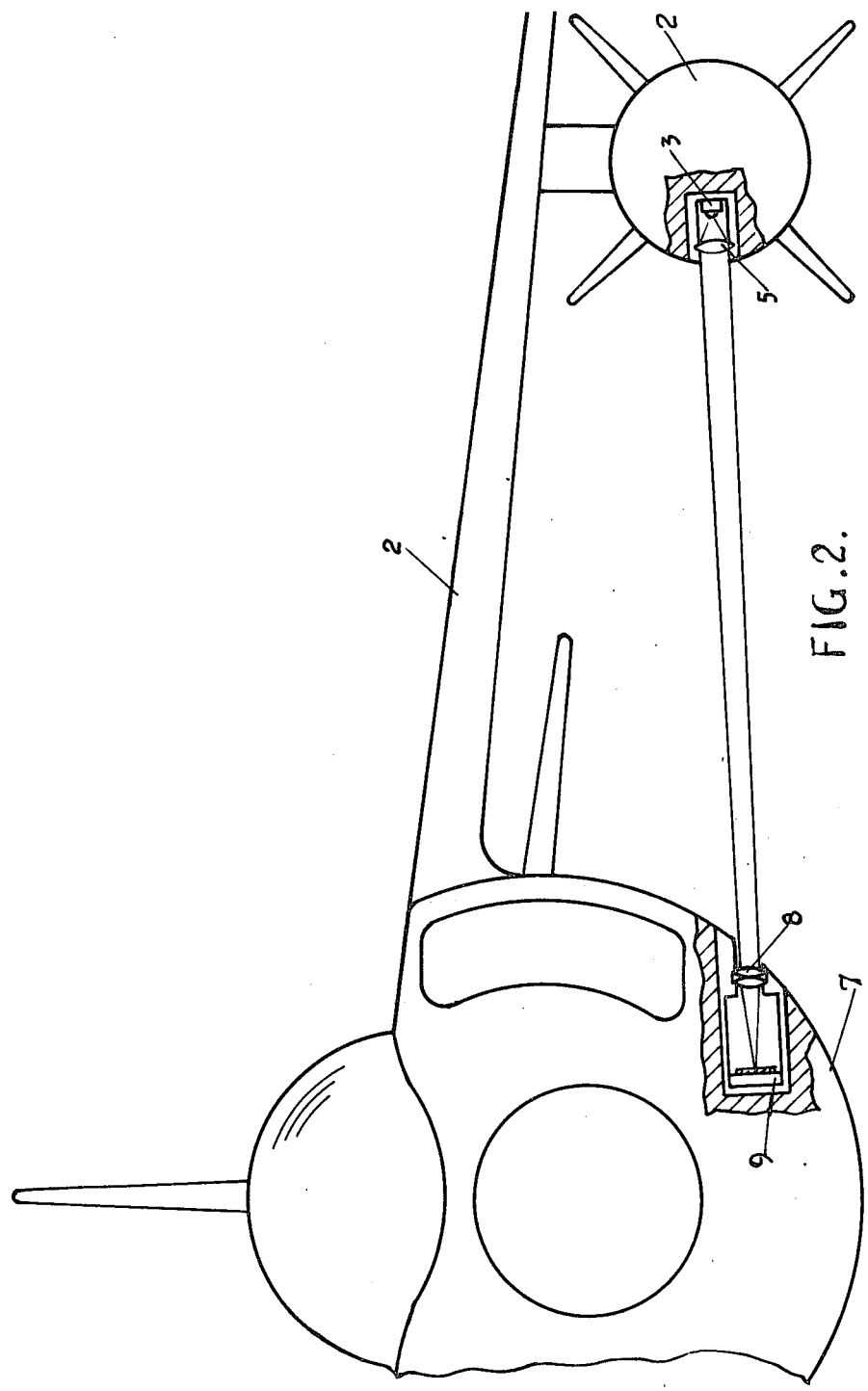
FIG. 2 is a diagrammatic front view of the part of the aircraft shown in FIG. 1.

Referring to FIGS. 1 and 2, the system includes a forward looking imaging device (not visible) housed in a pod 1 mounted on the underside of a wing 2 of the aircraft. Two infra red radiation sources 3 and 4 are mounted on the inboard side of the pod 1 at positions one on either side of and equally spaced from the axis about which twisting of the wing 2 takes place in flight. The sources 3 and 4 suitably comprise light emitting diodes. The sources could, of course, be alternatively mounted on a part of the wing which is sufficiently close to the component to be fixed relationship with the component.

Each of the sources 3 and 4 is associated with a respective lens system 5 or 6 whereby a focussed or condensed beam of radiation from the source 3 or 4 is directed towards the aircraft fuselage 7.

On the fuselage 7, where the beams impinge, there is mounted a further lens system 8 which serves to focus the two beams onto respective linear arrays of infra red sensors 9 and 10, the arrangement being such that radiation from the sources 3 and 4 is focussed onto the sensors 9 and 10 respectively over the whole range of possible movement of the sources due to wing flexing.

In operation, as the wing 2 twists, causing pitching of the pod 1, the sources 3 and 4 move in opposite directions causing corresponding movement of the focussed beams along the sensor arrays 9 and 10. By comparison of the positions of the focussed beams a signal representing the pitch angle of the pod 1 with respect to the aircraft boresight may be obtained, which signal may be utilised by the weapon system to take account of misalignment of the line of sight of the imaging system housed in the pod 1 and the aircraft boresight.

The infra red sensors 9 and 10 suitably comprise charge-coupled devices (CCDs) of the kind comprising a linear array of elements each of which is arranged to store an electric charge representative of the intensity of infra red radiation falling onto it. The stored charge pattern can be read out from the CCD, when desired, by a sequential clocking process similar to that employed with a shift register.

Figure 3:
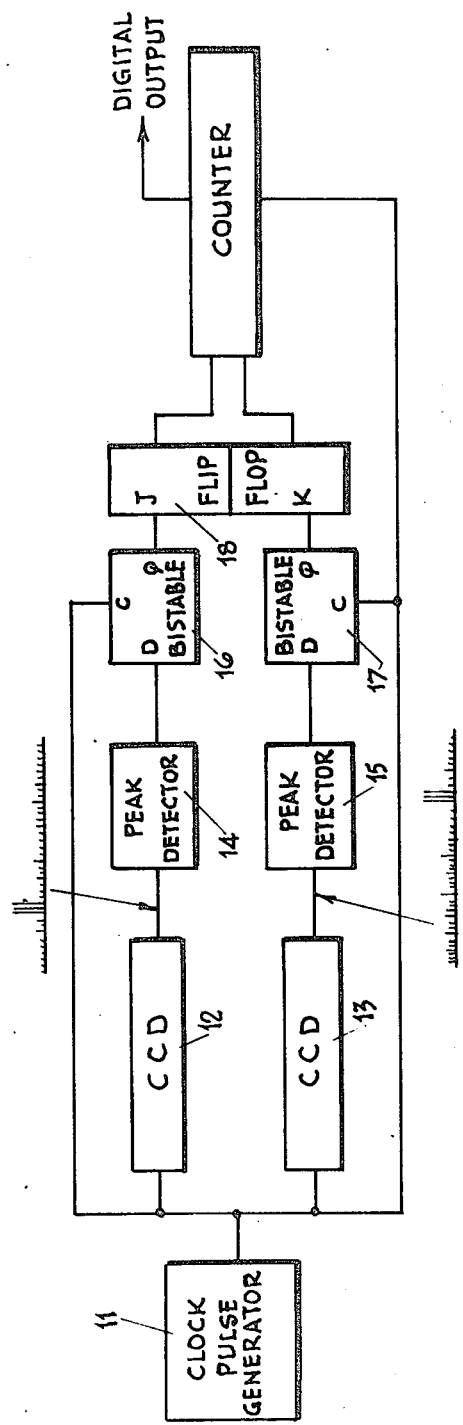
FIG. 3 is a block schematic diagram of an electric circuit forming part of the system.

A circuit arrangement for producing from charge-coupled devices used for the sensor arrays 9 and 10 an output representative of the pod pitch angle of a form suitable for use by a digital computer incorporated in the weapon system will now be described with reference to FIG. 3.

The circuit includes a clock pulse generator 11 which controls read out of the charge patterns stored in the two CCDs 12 and 13, the two CCDs being read out simultaneously. The output of each of the CCDs 11 and 12 comprises a train of pulses, one pulse for each element of the CCD, the pulses corresponding to the CCD elements on which the focussed beam impinges being relatively large. Typically each focussed beam covers a number of adjacent CCD elements so that each CCD output contains a number of adjacent large pulses at a time dependent on the position of the focussed beam on that CCD.

The CCD outputs are supplied to respective peak detectors 14 and 15 to eliminate small pulses in the CCD outputs, and the output of each of the peak detectors 14 and 15 is applied to the 'D' input of a respective D-type bistable 16 or 17, the 'C' input of each bistable being supplied with pulses from the clock pulse generator 11. Thus, during CCD read-out, each of the bistables 16 and 17 produces an output pulse starting with the first of the group of adjacent relatively large pulses in the output of the associated CCD, and finishing with the first clock pulse occurring after the group of adjacent relatively large pulses.

The outputs of the bistables 16 and 17 are applied respectively to the J and K inputs of a J-K flip-flop 18 which controls a counter 19 supplied with pulses from the clock pulse generator 11 to produce a digital output representative of the time displacement of the output pulses of the bistables 16 and 17. Thus, the counter output is representative of the difference between the positions of the focussed beams on the CCDs 12 and 13, and hence of the pitch angle of the pod 1. It will be appreciated that during wing bending, as opposed to wing twisting, the focussed beams on the CCDs 12 and 13 move in unison so that no change in the output of the counter 19 occurs in response to wing bending.

The output of the counter 19 is utilised by the computer (not shown) to take account of misalignment of the aircraft axis and the line of sight of the imaging system in computing trajectories of weapons to be launched at targets detected by the imaging system.

I claim:

1. An aircraft weapon system including a component mounted on a wing of an aircraft and means for measuring changes in the alignment of the component with respect to a reference axis fixed with respect to the main body of the aircraft due to deflection of the wing, said means comprising: a source of electromagnetic radiation and an array of sensors for said radiation mounted one in fixed relationship with said component and another on the main body of the aircraft, said source directing a beam of radiation onto said array; and means for producing an output signal representative of the position at which said beam impinges on said array.

2. A system according to claim 1 wherein there are two said arrays and two said sources each of which sources directs a respective beam onto a respective said array, each said array being associated with a said means for producing an output signal and being so positioned with respect to its associated source that the two arrays give rise to output signals which together are representative of the pitch angle of said component with respect to the said reference axis.

3. A system according to claim 2 wherein said two sources are mounted in fixed relationship with said component at positions one on either side of and equally spaced from the axis about which twisting of the wing takes place in flight.

4. A system according to claim 3 wherein said two arrays are mounted adjacent one another on the main body of the aircraft and are associated with a common lens system whereby the beams received from said sources are focussed onto the two arrays.

5. A system according to claim 1 wherein said source emits infra red radiation.

6. A system according to claim 5 wherein said source is a light emitting diode.

7. A system according to claim 1 wherein said array is a charge-coupled device.

8. A system according to claim 2 wherein each said array is a charge-coupled device and said means for producing an output signal comprises means for reading out the charge-coupled devices simultaneously to produce a pair of pulses whose time displacement is representative of said pitch angle.

9. A system according to claim 8 including a counter and means for utilising said pair of pulses to control said counter to produce a digital output representative of said pitch angle.

* * * * *